US012399983B1

(12) United States Patent
Bevis et al.

(10) Patent No.: US 12,399,983 B1
(45) Date of Patent: Aug. 26, 2025

(54) STATEFUL AUTHENTICATED EVENT COMMUNICATION

(71) Applicant: Amazon Technologies, Inc., Reno, NV (US)

(72) Inventors: Troy Lawson Bevis, Seattle, WA (US); Daniel John Farrell, Seattle, WA (US); Nathan Pritchard, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 331 days.

(21) Appl. No.: 16/794,554

(22) Filed: Feb. 19, 2020

(51) Int. Cl.
  *G06F 21/55* (2013.01)
  *H04L 9/32* (2006.01)
  *H04L 9/40* (2022.01)

(52) U.S. Cl.
  CPC .......... *G06F 21/552* (2013.01); *H04L 9/3236* (2013.01); *H04L 63/1458* (2013.01); *G06F 2221/033* (2013.01)

(58) Field of Classification Search
  CPC ............. G06F 21/552; G06F 2221/033; H04L 63/1458; H04L 9/32; H04L 9/3236
  See application file for complete search history.

(56) References Cited

U.S. PATENT DOCUMENTS

| | | | |
|---|---|---|---|
| 5,613,113 A | 3/1997 | Goldring | |
| 5,887,131 A * | 3/1999 | Angelo | G06F 21/34 714/36 |
| 7,711,758 B1 | 5/2010 | Gillespie | |
| 8,079,081 B1 | 12/2011 | Lavrik et al. | |
| 8,156,553 B1 | 4/2012 | Church et al. | |
| 8,230,228 B2 | 7/2012 | Hahn | |
| 8,452,968 B2 | 5/2013 | Flores | |
| 9,178,701 B2 | 11/2015 | Roth | |
| 9,282,106 B2 | 3/2016 | Fahrny | |

(Continued)

FOREIGN PATENT DOCUMENTS

| | | | |
|---|---|---|---|
| CN | 103186434 A | * | 7/2013 |
| EP | 2897051 A2 | | 7/2015 |

(Continued)

OTHER PUBLICATIONS

Fengwei Zhang; IOCheck: A Framework to Enhance the Security of I/O Devices at Runtime; 2013 43rd Annual IEEE/IFIP Conference; (Year: 2013).*

(Continued)

*Primary Examiner* — Luu T Pham
*Assistant Examiner* — Chao Wang
(74) *Attorney, Agent, or Firm* — Hogan Lovells US LLP (57) ABSTRACT

Communications, such as system event log messages, can be authenticated using a hash value included in the messages. In some embodiments, the hash can be generated using secret hash parameters to generate a hash of the prior message in the sequence. The hash is stored to BIOS memory that is inaccessible, or at least not exposed, to an operating system executing on the computing device. A recipient, such as the BMC on the computing device, receiving these messages over an appropriate interface can compare the received and expected hash values in order to attempt to authenticate those messages. Authenticated messages can be processed, while unauthenticated messages can be dropped and remedial action taken as appropriate.

17 Claims, 6 Drawing Sheets

(56) References Cited

U.S. PATENT DOCUMENTS

| | | | |
|---|---|---|---|
| 9,916,262 | B2 | 3/2018 | Sauks |
| 10,783,250 | B2 | 9/2020 | Hershman et al. |
| 2003/0172265 | A1 | 9/2003 | Vu |
| 2003/0196110 | A1* | 10/2003 | Lampson ............ H04L 63/0435 |
| | | | 713/176 |
| 2003/0236992 | A1 | 12/2003 | Yami |
| 2005/0086370 | A1 | 4/2005 | Howard et al. |
| 2005/0210331 | A1 | 9/2005 | Connelly |
| 2005/0246612 | A1* | 11/2005 | Leis ................... G06F 11/0727 |
| | | | 714/763 |
| 2007/0300207 | A1* | 12/2007 | Booth .................. G06F 21/575 |
| | | | 717/124 |
| 2008/0028235 | A1 | 1/2008 | Smith |
| 2008/0130893 | A1 | 6/2008 | Ibrahim et al. |
| 2008/0181406 | A1 | 7/2008 | Iyer |
| 2008/0301200 | A1 | 12/2008 | Doty |
| 2009/0228701 | A1 | 9/2009 | Lin |
| 2009/0271637 | A1 | 10/2009 | Takekawa et al. |
| 2010/0082984 | A1* | 4/2010 | Ellison ................. H04L 9/3236 |
| | | | 713/170 |
| 2010/0088522 | A1 | 4/2010 | Barrus et al. |
| 2010/0217985 | A1 | 8/2010 | Fahrny |
| 2011/0131188 | A1 | 6/2011 | Graziani et al. |
| 2011/0154023 | A1 | 6/2011 | Smith |
| 2011/0265183 | A1* | 10/2011 | Wu ......................... G06F 21/74 |
| | | | 718/1 |
| 2012/0151223 | A1 | 6/2012 | Conde Marques |
| 2012/0278655 | A1 | 11/2012 | Lin |
| 2013/0086663 | A1 | 4/2013 | Roth |
| 2014/0280837 | A1* | 9/2014 | Ayanam ............. H04L 43/0817 |
| | | | 709/223 |
| 2016/0188897 | A1 | 6/2016 | Zatko et al. |
| 2016/0335201 | A1 | 11/2016 | Lea |
| 2017/0131991 | A1* | 5/2017 | Su ............................. G06F 8/66 |
| 2017/0366342 | A1 | 12/2017 | Gehrmann |
| 2017/0373839 | A1* | 12/2017 | Suresh ................... G06F 21/44 |
| 2018/0060051 | A1 | 3/2018 | Ramalingam et al. |
| 2018/0157700 | A1 | 6/2018 | Roberts |
| 2018/0307867 | A1 | 10/2018 | Dover |
| 2018/0357425 | A1 | 12/2018 | Swaminathan et al. |
| 2018/0365422 | A1 | 12/2018 | Callaghan et al. |
| 2019/0116038 | A1 | 4/2019 | Sprague |
| 2020/0044865 | A1 | 2/2020 | Ward |
| 2020/0065273 | A1 | 2/2020 | Bouda et al. |
| 2020/0084042 | A1 | 3/2020 | Nelson |
| 2020/0099536 | A1 | 3/2020 | Block et al. |
| 2020/0167472 | A1 | 5/2020 | Hertenstein |
| 2020/0314115 | A1 | 10/2020 | Nabeesa et al. |
| 2021/0034748 | A1 | 2/2021 | Ahmed |
| 2021/0089416 | A1* | 3/2021 | Katayama ........... G06F 11/2284 |
| 2021/0099281 | A1 | 4/2021 | Sloane |
| 2021/0406378 | A1 | 12/2021 | Jeansonne |

FOREIGN PATENT DOCUMENTS

| | | |
|---|---|---|
| WO | WO-0073880 | 12/2000 |
| WO | 2019088975 | 5/2019 |

OTHER PUBLICATIONS

Qian Wang • Senlin Feng • Qingqing Guo • Xiaofeng Ma • Tianqi Yu • Fangjun Fan; A dual BIOS safe startup method based on national devices; 2023 4th International Conference on Computer Engineering and Application (ICCEA) (2023, pp. 77-82); (Year: 2023).*

Kuan-Jen Lin • Chin-Yi Wang; Using TPM to improve boot security at BIOS layer; 2012 IEEE International Conference on Consumer Electronics (ICCE) (2012, pp. 376-377); (Year: 2012).*

Arbaugh, W.A. • Farber, D.J. • Smith, J.M.; A secure and reliable bootstrap architecture; Proceedings. 1997 IEEE Symposium on Security and Privacy (Cat. No. 97CB36097) (1997, pp. 65-71); (Year: 1997).*

J. Kelsey et al., "Signed Syslog Messages", RFC 5848, DOI: 10.17487/RFC5848, May 2010, <https://www.rfc-editor.org/info/rfc5848>, ISSN: 2070-1721, pp. 1-40.

Non-Final Office Action issued in U.S. Appl. No. 16/799,208, dated Feb. 17, 2023.

Non-Final Office Action issued in U.S. Appl. No. 16/799,208, dated Dec. 17, 2021.

Final Office Action issued in U.S. Appl. No. 16/799,208, dated Jun. 10, 2022.

Non-Final Office Action issued in U.S. Appl. No. 16/781,291, dated Nov. 25, 2022.

Non-Final Office Action issued in U.S. Appl. No. 16/781,291, dated Mar. 3, 2022.

IPMI-, "Intelligent Platform Management Interface Specification Second Generation", v2.0, Rev. 1.1, Intel, Hewlett-Packard, NEC, Dell, Oct. 2013 (644 total pages).

Final Office Action issued in U.S. Appl. No. 16/799,208, dated Sep. 8, 2023.

Final Office Action issued in U.S. Appl. No. 16/781,291, dated Jun. 8, 2023.

Non-Final Office Action issued in U.S. Appl. No. 16/781,291, dated Nov. 17, 2023.

U.S. Non-Final Office Actin issued in U.S. Appl. No. 16/799,208 dated Jun. 12, 2024.

U.S. Final Office Action issued in U.S. Appl. No. 16/781,291 dated May 23, 2024.

* cited by examiner

STATEFUL AUTHENTICATED EVENT COMMUNICATION

BACKGROUND

In a multi-tenant resource environment, or "cloud environment," resources such as servers may be provisioned for use by various users. In order to manage these resources, informational messages such as system event logs (SELs) can be used to indicate when there is an occurrence detected with respect to one or more of these resources. Occurrences of interest can be of various types, such as for memory corruption or incorrect configuration. These system event logs can be used to diagnose and act on such occurrences. In some cases, however, a user may have a host operating system (OS) executing on that server, enabling that host instance to send unauthentic system event logs, including those which can trigger a power-down and manual maintenance of the server. In effect, an attacker could trigger an attack such as a denial of service (DOS) attack on user instances and resource infrastructure. Further, this unnecessary manual maintenance by data center staff will be costly and time consuming for a provider of those resources.

BRIEF DESCRIPTION OF THE DRAWINGS

Various embodiments in accordance with the present disclosure will be described with reference to the drawings, in which.

DETAILED DESCRIPTION

Approaches in accordance with various embodiments provide for the authentication of messages or other such communications. In particular, various embodiments utilize a stateful hash as a mechanism for authenticating messages, as may be sent over a specific communication channel from a specific source. In at least one embodiment, an error can be detected that causes a message, such as a system event log message, to be generated by a source, such as the basic input/output system (BIOS) on a computing device. The source can send this message over an appropriate channel to a target recipient, such as the baseboard management controller (BMC). In order to authenticate that the message was generated by the BIOS or other appropriate source, rather than an operating system (OS) executing on the computing device or other unauthorized source, the BIOS can cause a hash value to be included in the message. The hash value can be a hash generated using secret hashing parameters, provided to the BIOS, and the prior system event log (SEL) message. A recipient, such as the BMC, of the SEL message can then compare the hash value in the message to the expected hash of the prior SEL message, and if the hash values match then the SEL message can be authenticated. If the hash values do not match, or if the hash value corresponds to an SEL message other than the prior SEL message, then the message can be dropped and remedial action can be taken. In the event that an actor such as a user OS on the computing device obtains the prior SEL and hashing parameters and can generate an otherwise valid hash for authenticating the SEL message, a next valid SEL message sent from the BIOS will then appear to be out of sequence, which then will trigger an authentication error. In this way, not only is the user OS prevented from sending valid SEL message, but if the user OS is able to obtain information for generating SEL messages the maintaining of state will still enable the BMC (or another recipient) to determine that there is a potential compromise on the computing device. Appropriate remedial action can then be taken, such as to reboot or isolate that computing device.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Various other functions can be implemented within the various embodiments as well as discussed and suggested elsewhere herein.

Figure 1:
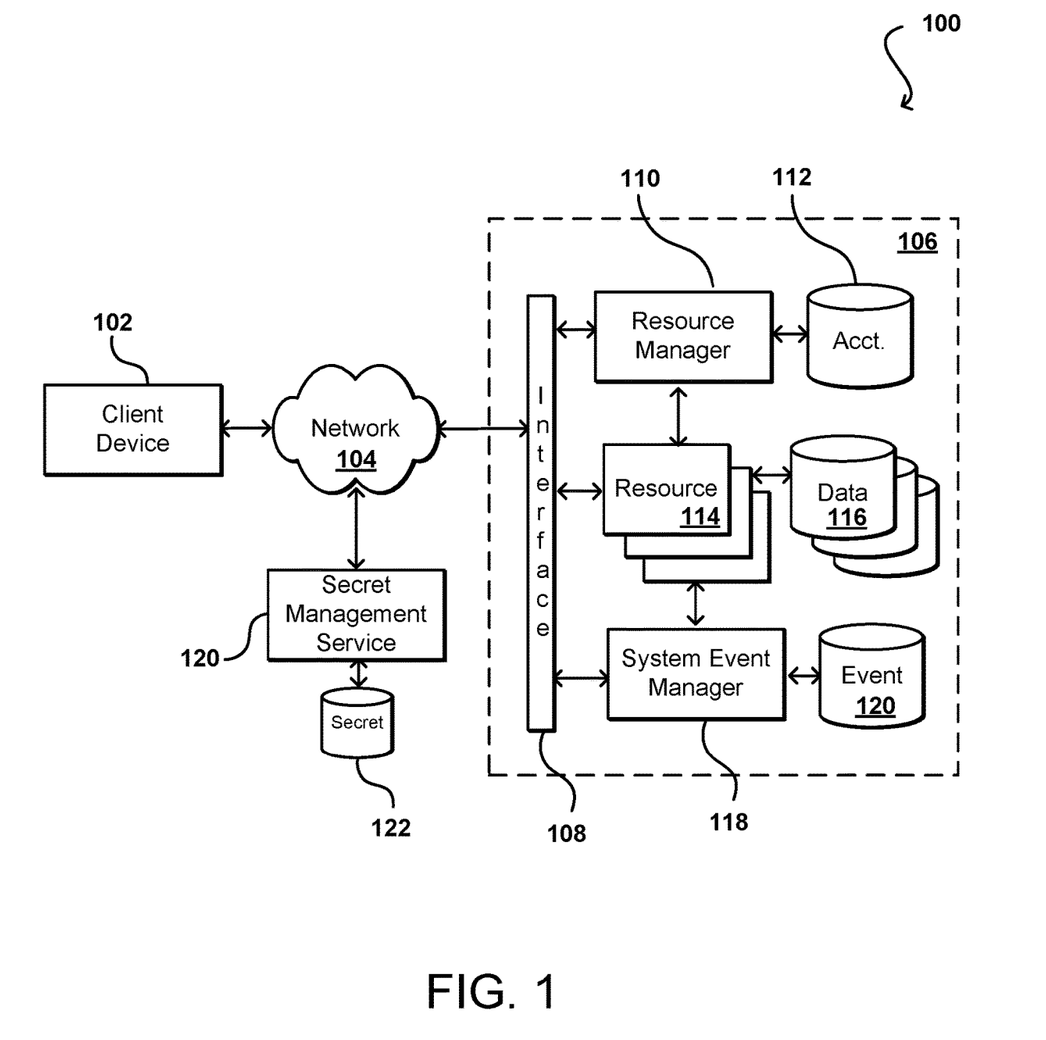
FIG. 1 illustrates components of an example resource environment that can be utilized in accordance with various embodiments.

FIG. 1 illustrates an example environment 100 in which aspect of various embodiments can be implemented. Such an environment can be used in some embodiments to provide resource capacity for one or more users, or customers of a resource provider, as part of a shared or multi-tenant resource environment. In this example a user is able to utilize a client device 102 to submit requests across at least one network 104 to a multi-tenant resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request. The environment can be secured such that only authorized users have permission to access those resources.

In various embodiments, a provider environment 106 may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 114 of one or more types. These types can include, for example, application servers operable to process instructions provided by a user or database servers operable to process data stored in one or more data stores 116 in response to a user request. As known for such purposes, a user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The provider can validate this information against information stored for the user. If a user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes. In some embodiments, a user can run a host operating system on a physical resource, such as a server, which can provide that user with direct access to hardware and software on that server, providing near full access and control over that resource for at least a determined period of time. Access such as this is sometimes referred to as "bare metal" access as a user provisioned on that resource has access to the physical hardware.

A resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

In this example, the resource provider environment 106 includes a system event manager 118 that is able to receive messages from various resources 114, 116 relating to events or occurrences that are detected on, or by, those resources. These can include, for example, system event logs generated on those resources and transmitted to the system event manager 118. These system event log (SEL) messages can serve as one way of notifying the infrastructure of the resource provider environment of problems with hardware in that environment. For example, an SEL message might indicate a problem with a processor or memory on a particular server in the environment. A SEL message might initiate from a source, such as system BIOS, on that server, and be sent to the BMC, which then forwards the message to the system event manager 118. In this example, data for those system event logs can be stored to an event log 120 for subsequent analysis. As mentioned, system event logs can be useful for resources such as managed servers, such as those offered through Amazon Web Services, Inc. (AWS). System event logs can correspond to notifications, from a lowest level of a resource stack on a resource, that something of interest has happened on, or with respect to, that resource. As mentioned, this may correspond to a memory corruption error that has occurred on a managed server, a processing error that has occurred, or an incorrect configuration that has been identified, among other such options.

In situations where a user might have a host OS executing on that resource, such as for a bare-metal server instance, however, the host (user) instance can send messages such as system event log messages. It is possible that these may unauthentic messages, or redundant messages, including messages which may unnecessarily trigger a power-down and manual maintenance of the server. Sending of such messages could be performed by an attacker who has targeted the user or user instance. Such messages could also be triggered by a malicious actor who could subscribe to many bare-metal instances and send system event logs indicating hardware failure. In effect, an attacker could cause a denial of service (DOS) attack on user instances and resource infrastructure. While taking a single bare metal server offline may only degrade the service to the user provisioned on that server, causing such action to be done for many servers concurrently at scale can cause a significant outage or degradation in service.

Approaches in accordance with various embodiments can provide for authentication of system event log entries or message to thwart such an attack. In at least some embodiments, this can involve including secure authentication data with messages, such as system event log (SEL) entries. For example, this can involve including a hash of one or more prior system event log messages. In at least one embodiment, individual system event log messages can include data for a current system event, as well as a hash of the prior system event log message. The hash of the prior system event log message serves as a secret for authentication, and the use of the prior system event log message causes the authentication to be stateful, as messages received out of sequence, or without the hash of the proper prior message, can be rejected as being unauthentic. In this way, even if an attacker is able to forge a system event log message including an accurate hash value, the next system event log message from the BIOS will be based off an earlier system event log message, and thus still will cause an authentication error to be generated. A recipient of a SEL message can compare the hash in the SEL message to the expected hash value. A match between these hash values can be used to authenticate a source of the message, and the message can be treated as valid. If the hash values do not match, then the message can be treated as suspicious. Such an approach can involve at least some amount of post-processing away from that server or host in order to authenticate the system event logs, such as by a system event manager 118 that is able to pull log data from a respective event log 120.

In this example, the hash value can be generated using any appropriate hashing algorithm and hashing parameters. This can include, for example, a SHA-256 or SHA-512 hashing algorithm, or a hash-based message authentication code (HMAC) generation algorithm, among other such options. In some embodiments a key or certificate can be used to generate, modify, or sign the message or hash. The key or certificate can be managed by a key management service 120 in at least some embodiments, which can be located within, or external to, the resource provider environment 106. The key management service can also be provided by the provider or a third party in various embodiments. The key management service can send the key or certificate to a resource, such as a server, upon specific events, such as during boot or restart of a server. The key or certificate can be sent to the respective server, and the key can also be stored to a local key repository 122. If a system event manager 118 is tasked with validating the system event logs, then the system event manager 118 can obtain the key or certificate from the key management service. In at least some embodiments, hashes (and any relevant keys or certificates) of prior system event log messages are stored in volatile memory on servers such that they will be lost upon a reboot or power down event, and must be retrieved again at power up or during the reboot process. In at least some embodiments, a new key may be sent at such an event to improve security.

Figure 2:
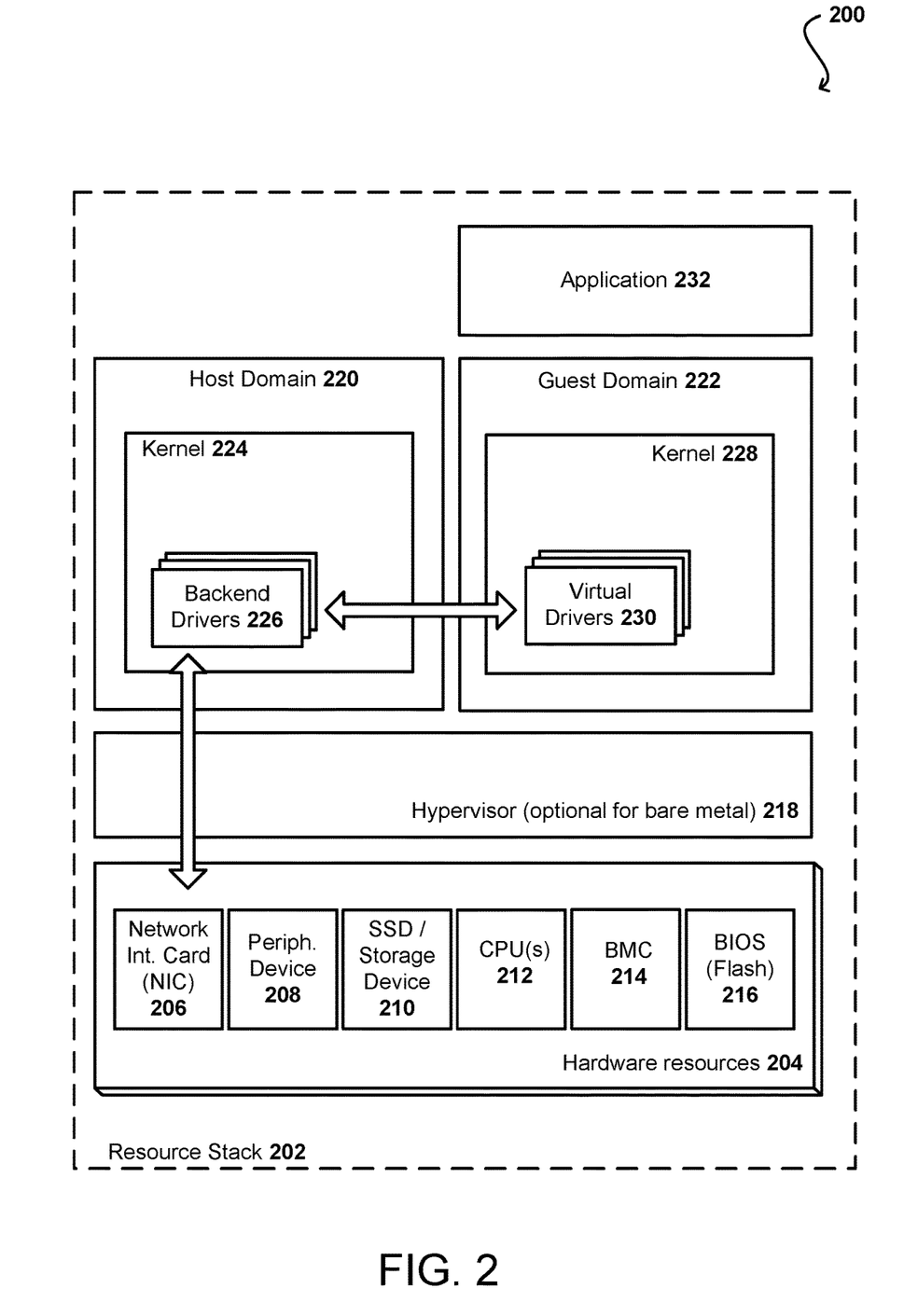
FIG. 2 illustrates an example resource stack for a computing device that can be utilized in accordance with various embodiments.

FIG. 2 illustrates an example resource stack 202 of a physical resource 200 that can be utilized in accordance with various embodiments. Such a resource stack 202 can be used to provide an allocated environment for a user (or customer of a resource provider) having an operating system provisioned on the resource. In accordance with the illustrated embodiment, the resource stack 202 includes a number of hardware resources 204, such as one or more central processing units (CPUs) 212; solid state drives (SSDs) or other storage devices 210; a network interface card (NIC) 206, one or more peripheral devices (e.g., a graphics processing unit (GPU), etc.) 208, a BIOS implemented in flash memory 216, and a baseboard management controller (BMC) 214, and the like. In some embodiments, the hardware resources 204 reside on a single computing device (e.g. chassis). In other embodiments, the hardware resources can reside on multiple devices, racks, chassis, and the like. Running on top of the hardware resources 204, a virtual resource stack may include a virtualization layer such as a hypervisor 218 for a Xen-based implementation, a host domain 220, and potentially also one or more guest domains 222 capable of executing at least one application 232. The hypervisor 218, if utilized for a virtualized environment, can manage execution of the one or more guest operating systems and allow multiple instances of different operating systems to share the underlying hardware resources 204. Conventionally, hypervisors are installed on server hardware, with the function of running guest operating systems, where the guest operating systems themselves act as servers.

In accordance with an embodiment, a hypervisor 218 can host a number of domains (e.g., virtual machines), such as the host domain 220 and one or more guest domains 222. In one embodiment, the host domain 220 (e.g., the Dom-0) is the first domain created and helps virtualize hardware resources and manage all of the other domains running on the hypervisor 218. For example, the host domain 220 can manage the creating, destroying, migrating, saving, or restoring the one or more guest domains 222 (e.g., the Dom-U). In accordance with various embodiments, the hypervisor 218 can control access to the hardware resources such as the CPU, input/output (I/O) memory, and hypervisor memory.

A guest domain 222 can include one or more virtualized or para-virtualized drivers 230 and the host domain can include one or more backend device drivers 226. When the operating system (OS) kernel 228 in the guest domain 222 wants to invoke an I/O operation, the virtualized driver 230 may perform the operation by way of communicating with the backend device driver 226 in the host domain 220. When the guest driver 230 wants to initiate an I/O operation (e.g., to send out a network packet), a guest kernel component can identify which physical memory buffer contains the packet (or other data) and the guest driver 230 can either copy the memory buffer to a temporary storage location in the kernel for performing I/O or obtain a set of pointers to the memory pages that contain the packet(s). In at least one embodiment, these locations or pointers are provided to the backend driver 226 of the host kernel 224 which can obtain access to the data and communicate it directly to the hardware device, such as the NIC 206 for sending the packet over the network.

It should be noted that the resource stack 202 illustrated in FIG. 2 is only one possible example of a set of resources that is capable of providing a virtualized computing environment and that the various embodiments described herein are not necessarily limited to this particular resource stack. In some embodiments, the guest domain 222 may have substantially native or "bare metal" access to the NIC 206 hardware, for example as provided by device assignment technology based on an IO Memory Management Unit (IO-MMU) device mapping solution like Intel VT-D. In such an implementation, there may be no virtualization layer (e.g., Hypervisor) present. The host domain, or OS, may then be provided by the user, with no guest domains utilized. Other technologies, such Single Root IO Virtualization (SR-IOV), may provide similar "bare metal" functionality to guest domains for only certain functionality of the devices. In general, in various other embodiments, the resource stack may comprise different virtualization strategies, hardware devices, operating systems, kernels, domains, drivers, hypervisors and other resources.

In compute servers, a Board Management Controller (BMC) 214 can maintain a list of events that have occurred in the system, referred to herein as a system event log (SEL). In at least one embodiment, the BMC 214 can receive system event logs from the BIOS 216 on the host processor. The BIOS 216 can provide data for system events over an appropriate interface, such as an I2C interface, to the BMC using an appropriate protocol, such as an SMBus System Interface (SSIF) or KCS interface over LPC. As mentioned, an example of a system event log event from BIOS includes an uncorrectable memory error, indicating a bad RAM stick. In at least some embodiments, system event logs recorded by BMCs on various resources can be used for purposes such as to monitor server health, including triggering manual replacement of parts or instance degrade when SELs from the BIOS indicate failure.

As mentioned, in a virtualized environment the hypervisor 218 can prevent the guest operating system, or guest domain 222, from sending such system event log data to the BMC 214. In the case of bare metal access without such a hypervisor, however, user instances can have the ability to send data for system event that spoof events from the BIOS 216. Such activity could lead to compromised bare metal instances being prematurely degraded due to fake system event data produced by the user OS.

In at least one embodiment, however, there will be portions of the physical resource 200 that will be inaccessible to the user OS. This can include, for example, at least a portion of BIOS memory 216. BIOS memory 216 in at least one embodiment is volatile memory such that any data stored to that memory will be lost in the event of a reboot or power down event. The BIOS may keep at least a portion of host memory unmapped, such that it is not discoverable by a host OS. As mentioned, data such as an authentication secret can be stored to BIOS memory 216 at boot time, before a user OS is executing on the resource. Once the user OS is executing on the resource, that OS will be prevented from accessing that secret in BIOS memory 216. In at least one embodiment, this secret (or other stored secret(s)) can be provided to the BMC 214 when adding system event log events, whereby the BMC 214 can confirm that the event is being sent by the BIOS 216 and not by the user OS.

In at least one embodiment, a secret stored to BIOS memory 216 can be added to each system event log message generated and sent by the BIOS. In at least one embodiment this can be performed for each "add system event log" request over a SMBus System Interface (SSIF) from BIOS. In at least one embodiment, the BMC can then confirm, upon determining that the authentication secret received with the message matches the expected secret, such as the hash value for the prior SEL message generated using the appropriate hashing parameters, that the BIOS is the source of the event data and not the user OS.

In at least some embodiments, a BMC 214 may send the authenticated system event log data to a target recipient, such as a system event manager. This sending may occur periodically, in response to a request from the event manager, or in response to a type of event that was detected. In at least some embodiments, a system event manager can store this data in an event log for subsequent analysis. The analysis can include identifying problems to be rectified, or potential problems to be investigated. Action can then be taken, such as to replace a component, change a configuration, or upgrade a system resource. In at least some embodiments, the event manager may also analyze data logged for invalid system event log messages. If it is determined that there have been a number of such messages from a single source, for a single user, or over a determined period of time, then the messages may be determined to be suspicious and remedial action may be taken, such as to power down those servers or deactivate a user account.

As mentioned, a secret can be stored in volatile memory on the server, so a power drain will wipe the secret from memory. The secret can stay inside this system RAM while the system is powered on. There will be memory protection in place in various embodiments so that a host operating system cannot gain access to this BIOS memory, acting as a type of memory barrier. Secret information can be provided or checked at boot time, before a user host operating system is up and running. In at least some embodiments, a SEL message could be spoofed if a malicious actor somehow obtained the secret, such as the hashing parameters and the hash of the prior system event log message. That actor could try to send those messages repeatedly, but after the first message the hash would no longer be of the prior message in the sequence, such that the messages would not be authenticated. If the actor generates new (fake) SEL messages and generates and includes hashes of the prior SEL messages, this process may succeed until such time as the BIOS attempts to send an SEL, which will include a hash of the last prior valid SEL from the BIOS. This will not be in sequence with the fake messages, and thus an un-authentication error can be generated.

In at least some embodiments, while a computing device (e.g., a server) is in a POST state, or a power on self-test state such as a boot, the BIOS on the device can request authentication data from, for example, the baseboard management controller (BMC) on the computing device. Various other secret providers or sources can be used as well as discussed and suggested herein. In at least one embodiment, the BIOS can request an initial hash value and has parameters from the BMC via an appropriate interface, such as the SSIF interface on an I²C bus. The initial hash value can be necessary in some embodiments because there would not have been a prior SEL message sent since this most recent POST state. The BIOS can then store the hash parameters and initial hash value in secure memory, inaccessible from the OS executing on the client device.

When the BIOS detects a first system event after POST in at least some embodiments, the BIOS can generate a system event log (SEL) message that includes the initial hash provided by the BMC and data for the first system event. In at least some embodiments, the computing device will be put into a POST state by the BIOS before sending this message. The BIOS can then send this SEL message, including the initial hash and SEL data, to the recipient, in this case the BMC. The BMC can authenticate this SEL message by matching the hash value, included in the received SEL message, with the initial hash value that was provided to the BIOS by the BMC. If the hash values match then the SEL message can be authenticated and processed accordingly. If the hash values do not match, then the message can be dropped as being unauthentic, and remedial action can be taken as appropriate. The BMC and the BIOS can both store the hash of the most recent SEL message for use in authenticated a subsequent SEL message. In at least some embodiments, the BMC will include flash memory storing a SEL database that includes information that can be shared with a system event manager, and the hash value can be stored to this memory that is inaccessible to the host OS on the computing device.

For subsequent SEL messages to be sent by the BIOS, the BIOS can generate a new system event log (SEL) message that includes data for a newly-determined first system event, such as a new system event log entry, as well as the hash of the prior SEL message. In at least some embodiments, the computing device will be put into a POST state by the BIOS before sending this message. The BIOS can send this new SEL message, including the new SEL data and the hash of the prior SEL message, to the recipient, in this case the BMC. The BMC can authenticate this SEL message by matching the hash value, included in the received SEL message, with the hash value for the prior SEL message in the sequence that was provided to the BIOS by the BMC and cached in memory on the BMC. If the hash values match then the SEL message can be authenticated and processed accordingly. If the hash values do not match, then the message can be dropped as being unauthentic, and remedial action can be taken as appropriate. The BMC and the BIOS can both calculate and store the hash of the most recent SEL message for use in authenticated a subsequent SEL message. As mentioned, in at least some embodiments each authentic SEL message will include the hash of the immediately prior SEL message, and that hash will only be valid for that specific SEL message. The receiving of the same hash value more than once will be deemed as an authentication error, as well as receiving a hash value for a SEL that is out of sequence.

In at least one embodiment, an algorithm for determining an authentication hash for an SEL message can be given by:

SEL (n)=
(initial_hash_from_bmc, event(0)) if n==0,
(secure_hash(SEL(n−1)), event(n)) if n!=0

Such an approach can provide various advantages. As mentioned, the storing of the hash value to BIOS memory during POST prevents the host OS from sending unauthentic SEL events to the BMC. Such an approach can also prevent the host OS from replaying old or leaked SEL events because the approach requires knowledge of the last SEL sent by the BIOS, as well as the secret hashing parameters. Further, such an approach can enable the BIOS (or a system event manager or other such system or service) to detect compromised systems, such as there the BMC rejects a latest SEL message due to a hash mismatch, whereby the computing device can be restarted, shut down, or isolated, among other such options. An action such as a restart can be performed by an external system or service, such as the system event manager, as well as the BMC in some embodiments, where the BMC can place a host in reset and report the event to a component such as a peripheral card with the ability to prevent the host OS from coming back up on the computing device until so instructed.

Figure 3:
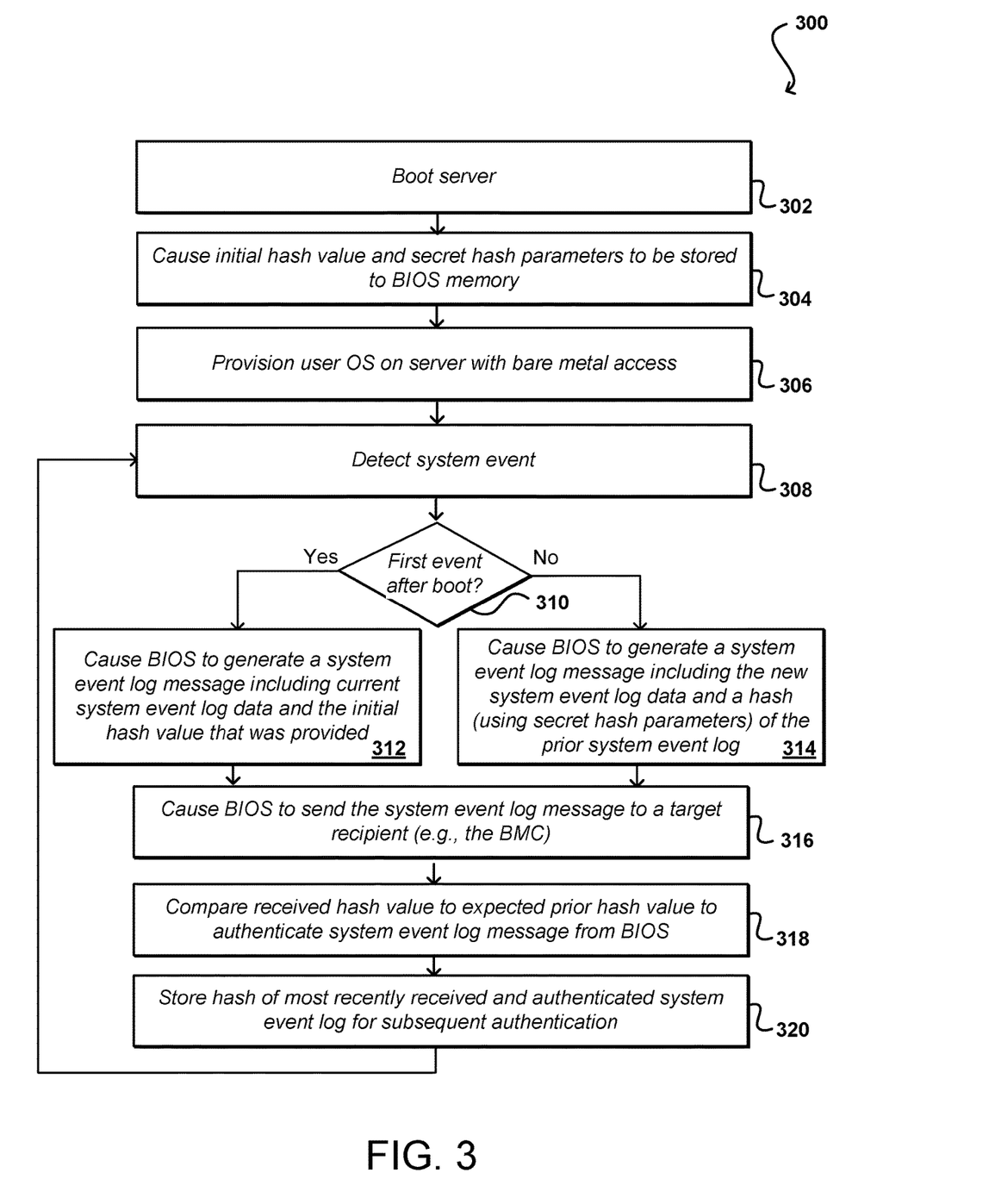
FIG. 3 illustrates an example process for sending an authenticatable system event log message that can be generated in accordance with various embodiments.

FIG. 3 illustrates an example process 300 for sending authenticatable system event data that can be utilized in accordance with various embodiments. It should be understood for this and other processes discussed herein that there can be additional, alternative, or fewer steps performed in similar or alternative orders, or in parallel, within the scope of the various embodiments unless otherwise stated. Further, although system event log messages are used as an example, it should be understood that various other types of communications can benefit from aspects of the various embodiments as well, as would be apparent to one of ordinary skill in the art in light of the teachings and suggestions contained herein. In this example, a server undergoes a boot 302 procedure during which time system BIOS is active but a user operating system is not yet executing, with hardware access, on the server. Similar states can occur during a reboot or other such action as well that puts the server in a POST state, where the system BIOS has control over the server during a self-test or a host OS is otherwise restricted from hardware access. While in such a state, an initial hash value and secret hash parameters (or other such secret information as discussed herein) can be caused 304 to be stored to BIOS memory. The initial hash and hashing parameters can be received, in some embodiments, by the BIOS requesting this information from the BMC via an SSIF interface. The hashing parameters can be any appropriate hashing parameters associated with any appropriate hashing algorithm, such as a SHA or HMAC algorithm. As mentioned, this BIOS memory may be a secure memory region that is unmapped or otherwise undiscoverable or inaccessible to the host OS. In some embodiments, hashing parameters can be updated while a server is in such a POST state. After startup is completed in this example, a user OS can be provisioned 306 and executed on the server, in this case with bare metal access. With bare metal access, there may be no virtualization layer (e.g., Hypervisor) preventing the host OS from sending system event log messages along the relevant bus.

During operation of the server, a system event can be detected 308. This detection can occur on, or for, any appropriate component or service (e.g., a processor or memory) on the server, and may come from a monitoring function in a hardware device as well, among other such options. In response to receiving information about the detected event, a determination can be made 310 as to whether this is the first event after a boot action on the server. If so, the BIOS can be caused 312 to generate a system event log (SEL) message including information about the system event, as well as the initial hash value that was provided by the BMC during POST. If it is not the first system event after POST, the BIOS can be caused 314 to generate a system event log (SEL) message including information about the system event as well as a hash of the prior SEL message. In some embodiments the BIOS will have calculated the hash when sending the prior SEL message, and will store the hash in BIOS memory. In other embodiments, the BIOS will store the prior SEL in memory and will use the relevant hashing parameters to generate a hash to include with the current SEL. The BIOS can then be caused 316 to send the SEL message, including the current SEL data and the hash value, to a target recipient, such as the BMC. In some embodiments, the BIOS can pass along the SEL message via an SSIF interface when the BIOS adds a SEL event during a system management interrupt (SMI). As mentioned, messages other than SELs can be sent that include hashes of prior messages as well, as may include power reset commands or commands to reset the BMC, among other such options. In at least one embodiment, the SEL message can be sent over an I²C bus to the BMC on the server. The recipient, such as the BMC, can extract the hash value from the received SEL message and compare 318 the received hash value to the stored and/or expected hash value (e.g., a hash of the prior SEL message generated using the secret hashing parameters) to verify authenticity of the system event log message from the BIOS. If the hash values match then the message is authentic and can be processed accordingly. A hash of the authenticated SEL message can then be generated, using the relevant hashing parameters, and stored 320 for subsequent authentication.

Figure 4:
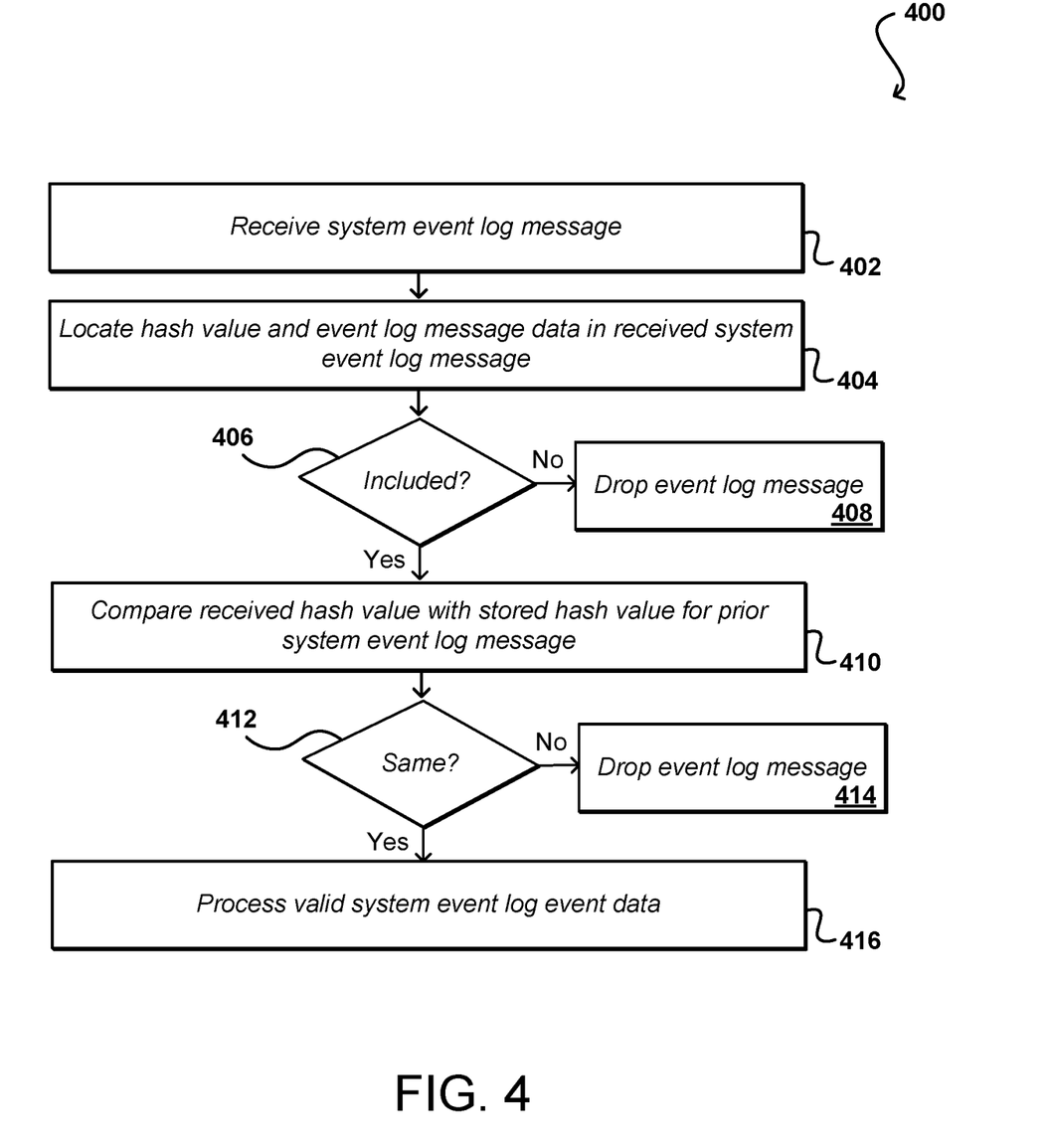
FIG. 4 illustrates an example process for verifying a source of a system event log message that can be generated in accordance with various embodiments.

As mentioned, a user or OS with bare metal access could potentially attempt to send fake system event log messages, or multiple instances of a valid event log message. Accordingly, FIG. 4 illustrates an example process 400 that can be used to authenticate a system event log message in accordance with various embodiments. As mentioned, other types of messages, communications, or data can be authenticated using such an approach as well within the scope of various embodiments. In this example, a system event log (SEL) message is received 402 over a communication channel, such as an I²C bus, from a sender such as system BIOS. A recipient of this message, such as the BMC on a server, can attempt to locate 404 a hash value included in an authentic system event log message from the sender. If it is determined 406 that no such hash value was included, or that the hash value was not of the appropriate form, then the event log message can be dropped 408 as being unable to be authenticated. As discussed elsewhere herein, various actions can be taken for an unauthenticated message, such as to write information for the unauthenticated message to a log that can be used to make subsequent action determinations. In some embodiments this information can be analyzed, along with other related information, to determine whether to take a remedial action, such as to restart the server or take the server offline. A determination of remedial action can be performed on, or remote, from the server in at least some embodiments.

If an appropriate hash value is located in the received message then the received hash value can be compared 410 with a stored (or generated) hash value corresponding to a hash of the prior SEL message (or the initial hash if a first SEL message after POST). If it is determined 412 that the received and expected hash values are not the same, then the system event log message can be dropped 414 as discussed above. If the two hash values are the same then the system event log message data can be processed 416 as having been authenticated to come from a valid source, such as system BIOS, as opposed to another source, such as a user OS. In various embodiments, processing of the message may involve analyzing the SEL data to determine a type of system event, logging the event data, or forwarding to system event manager for analysis, among other such options. In some embodiments, the BMC will store the SEL data to a local repository, which is accessible to an external system or service, such as a system event manager. The system event manager can then make a decision as to whether to take a remedial action, such as to reboot that server or take one or more servers offline, such as where problems have been identified for multiple servers. The BMC can also be caused to store a hash value of the authenticated SEL message, or store the authenticated SEL message for use in generating a hash, that can be used for a subsequent authentication.

Figure 5:
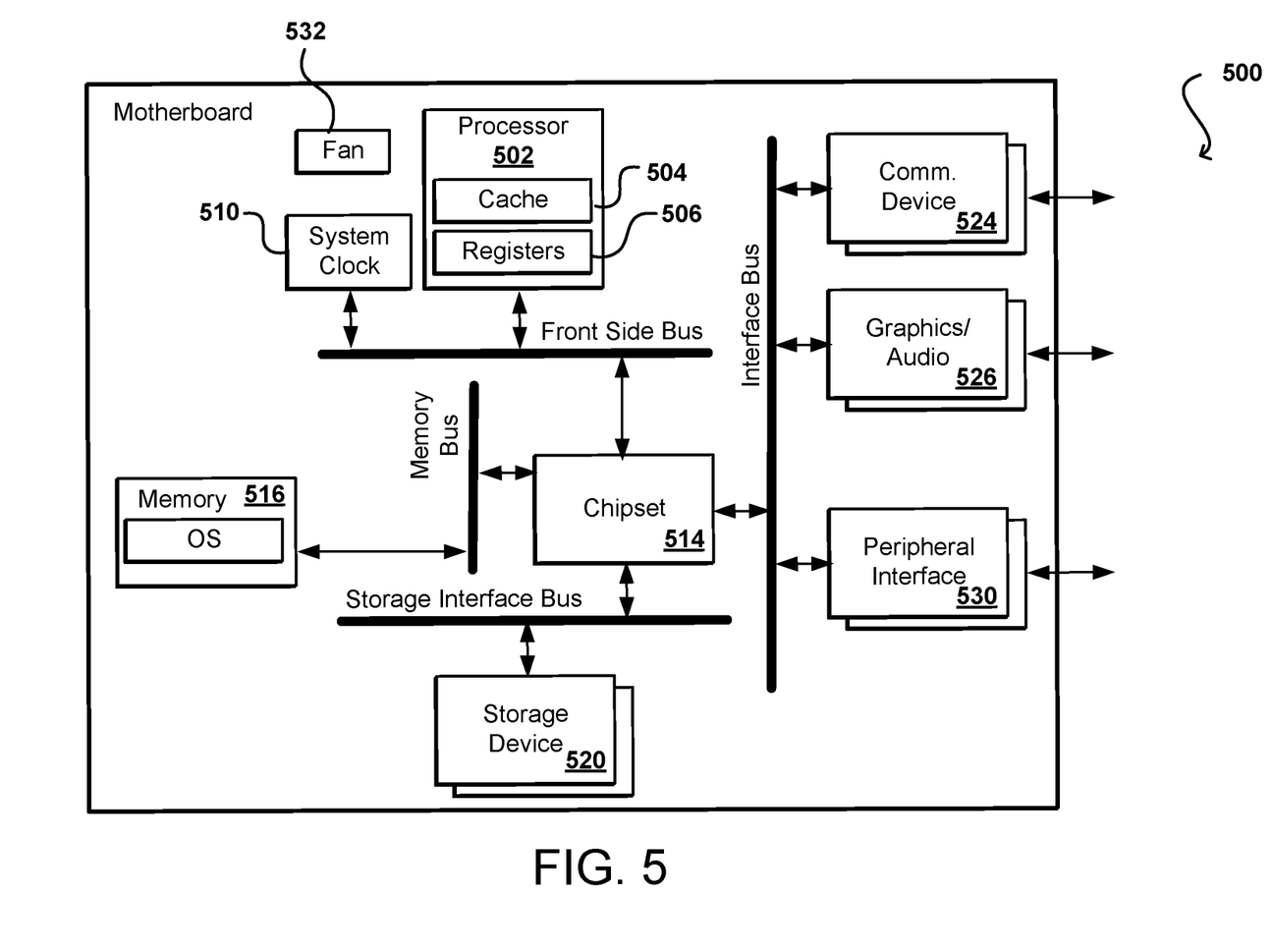
FIG. 5 illustrates components of an example computing device that can be utilized in accordance with various embodiments.

Computing resources, such as servers, that can have software and/or firmware updated in such a matter will generally include at least a set of standard components configured for general purpose operation, although various proprietary components and configurations can be used as well within the scope of the various embodiments. FIG. 5 illustrates components of an example computing device 500 that can be utilized in accordance with various embodiments. As known for computing devices, the computer will have one or more processors 502, such as central processing units (CPUs), graphics processing units (GPUs), and the like, that are electronically and/or communicatively coupled with various components using various buses, traces, and other such mechanisms. A processor 502 can include memory registers 506 and cache memory 504 for holding instructions, data, and the like. In this example, a chipset 514, which can include a northbridge and southbridge in some embodiments, can work with the various system buses to connect the processor 502 to components such as system memory 516, in the form or physical RAM or ROM, which can include the code for the operating system as well as various other instructions and data utilized for operation of the computing device. The computing device can also contain, or communicate with, one or more storage devices 520, such as hard drives, flash drives, optical storage, and the like, for persisting data and instructions similar, or in addition to, those stored in the processor and memory. The processor 502 can also communicate with various other components via the chipset 514 and an interface bus (or graphics bus, etc.), where those components can include communications devices 524 such as cellular modems or network cards, media components 526, such as graphics cards and audio components, and peripheral interfaces 530 for connecting peripheral devices, such as printers, keyboards, and the like. At least one cooling fan 532 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 502 can obtain data from physical memory 516, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 504 in at least some embodiments. The computing device 500 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 530, a communication device 524, a graphics or audio card 526, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 502 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)) In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O) adapter device. In some embodiments, the I/O adapter device is attached externally to the host device. In some embodiments, the V/O adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

Figure 6:
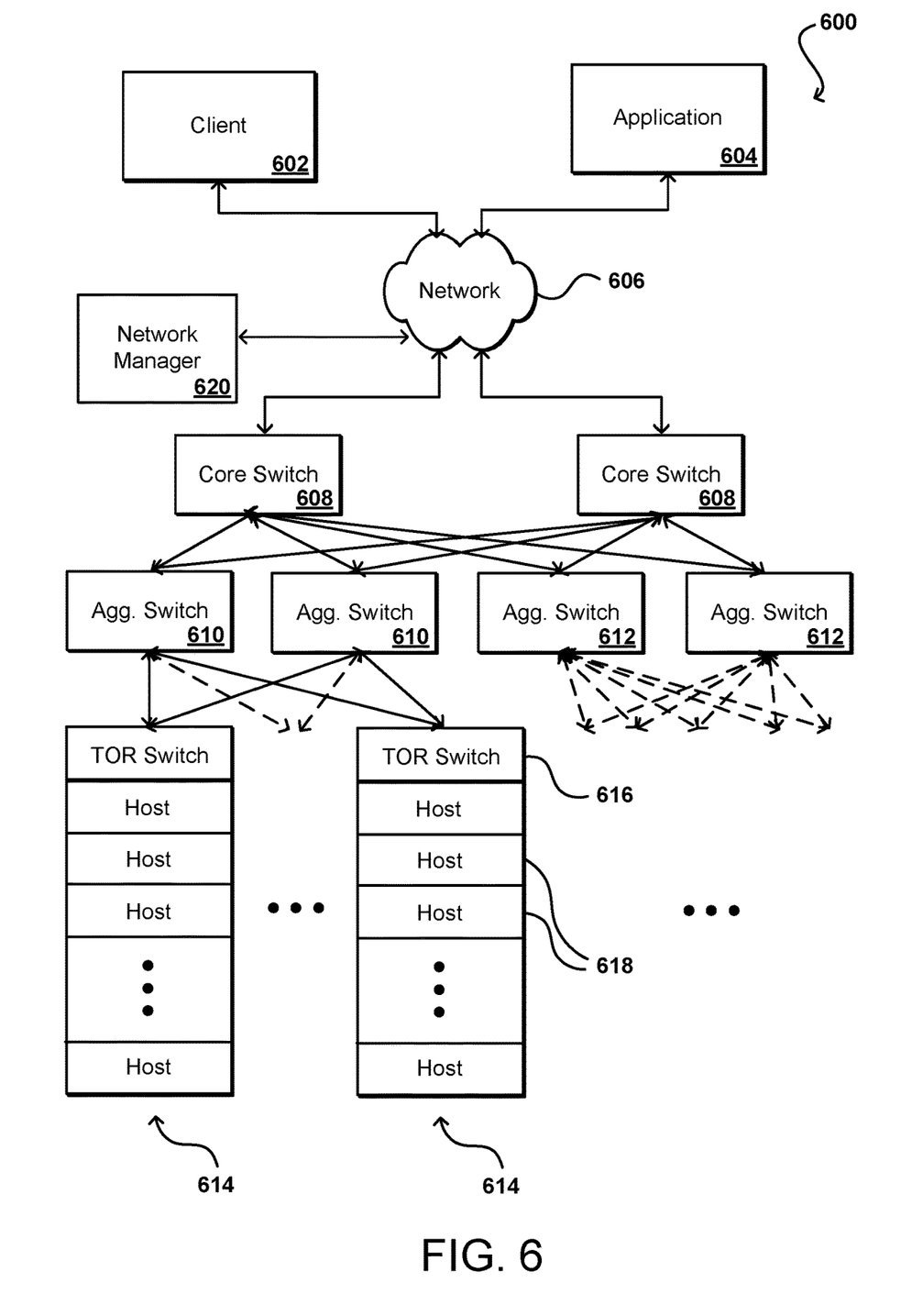
FIG. 6 illustrates components of an example environment in which aspects of the various embodiments can be implemented.

As mentioned, in many instances the live updating of BIOS for a server can occur in a shared resource environment, such as a data center or server farm. FIG. 6 illustrates an example network configuration 600 that can be used to route communications between specific host machines or other such devices in such an environment. This example shows a typical design that can be used for a data center, wherein a source such as a client device 602 or application 604 is able to send requests across at least one network 606, such as the Internet or a cellular network, to be received by one or more components of the data center. Properties of various components of the network, such as provisioned instances, etc., can be managed using at least one management system, component, or service 620. In this example, the requests are received over the network to one of a plurality of core switches 608, but it should be understood that there can be any of a number of other components between the network and the core switches as known in the art. As traditional differentiators have substantially disappeared, the terms "switch" and "router" can be used interchangeably. For purposes of clarity and explanation this document standardizes on the term "switch," but it should be understood this term as used also encompasses routers and other devices or components used for such purposes. Further, the switches can include any appropriate switch, such as a multilayer switch that operates at different levels in an OSI (Open System Interconnection) reference model.

As illustrated, each core switch 608 is able to communicate with each of a plurality of aggregation switches 610, 612, which in at least some embodiments are utilized in pairs. Utilizing aggregation switches in pairs provides a redundant capability in case one or the switches experiences a failure or is otherwise unavailable, such that the other device can route traffic for the connected devices. As can be seen, each core switch in this example is connected to each aggregation switch, such that the tiers in this example are fully connected. Each pair of aggregation switches 610, 612 is linked to a plurality of physical racks 614, each of which typically contains a top of rack (TOR) or "access" switch 616 and a plurality of physical host machines 618, such as data servers and other processing devices. As shown, each aggregation switch can be connected to a number of different racks, each with a number of host machines. For the respective portion of the network, the aggregation pairs are also fully connected to the TOR switches.

As an additional benefit, the use of aggregation switch pairs enables the capability of a link to be exceeded during peak periods, for example, wherein both aggregation switches can concurrently handle and route traffic. Each pair of aggregation switches can service a dedicated number of racks, such as one hundred twenty racks, based on factors such as capacity, number of ports, etc. There can be any appropriate number of aggregation switches in a data center, such as six aggregation pairs. The traffic from the aggregation pairs can be aggregated by the core switches, which can pass the traffic "up and out" of the data center, such as back across the network 606. In some embodiments, the core switches are provided in pairs as well, for purposes including redundancy.

In some embodiments, such as high radix interconnection networks utilized for high-performance computing (HPC) or other such purposes, each physical rack can contain multiple switches. Instead of a single physical TOR switch connecting twenty-one hosts in a rack, for example, each of three switches in the rack can act as a local TOR switch for a "logical" rack (a sub-rack of a physical rack or logical grouping of devices (hosts and/or switches) from multiple racks), with each local TOR switch connecting seven of the host machines. The logical racks can be implemented using physical or wireless switches in different embodiments. In some embodiments each of these switches within a high performance computing rack manages up to twelve servers, but the number can vary depending on factors such as the number of ports on each switch. For example, if a switch contains twenty-four ports, half of those ports typically will be host-facing and the other half will face the external network. A design in accordance with one embodiment could utilize seven racks with three switches in each, with each switch communicating (redundantly) with twelve servers, which would generally be equivalent to twenty-one separate racks each with a single TOR switch communicating with twelve servers, for example. In subsequent figures and description, it should be understood that physical or logical racks can be used within the scope of the various embodiments.

Various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes May be made thereunto without departing from the broader spirit and scope of the invention as set forth in the claims.

What is claimed is:

1. A computer-implemented method, comprising:
    detecting, on a computing device having an operating system (OS) associated with a separate entity, a system event;
    generating, by Basic Input Output System (BIOS) on the computing device, a system event log (SEL) message corresponding to the system event;
    causing a hash value to be included in the generated SEL message, the hash value corresponding to a hash of an immediately prior SEL message generated using specified hashing parameters, the specified hashing parameters for the hash value being stored in unmapped BIOS memory at boot time and inaccessible to the OS executing on the computing device;
    sending the SEL message, including the hash value, over a specified communication channel to a recipient component of the computing device;
    enabling the recipient component to authenticate the SEL message by determining that the hash value, included in the SEL message, corresponds to the hash of the prior SEL message generated using the specified hashing parameters previously sent to the BIOS; and
    performing at least one action in response to data contained in the authenticated SEL message, the at least one action including at least one of determining information associated with the system event, performing a remedial action, logging the data, or forwarding the data to a target recipient.

2. The computer-implemented method of claim 1, further comprising:
    causing the specified hashing parameters to be stored to the BIOS memory before the OS is executing on the computing device.

3. The computer-implemented method of claim 1, wherein the hash value is generated using a SHA-256, SHA-512, or HMAC hashing algorithm.

4. The computer-implemented method of claim 1, wherein the recipient component is a baseboard management controller (BMC) on the computing device, and wherein the SEL message is sent using an SMBus System Interface (SSIF).

5. A computer-implemented method, comprising:
    detecting, on a computing device, a system event;
    generating, by a source component on the computing device, a system event message corresponding to the system event;

causing a hash to be included in the generated system event message, the hash generated using provided hashing parameters and a prior system event message, the provided hashing parameters for the hash stored in unmapped memory at boot time and inaccessible to an operating system (OS) executing on the computing device;

sending the system event message, including the hash, over a specified communication channel to a recipient component on the computing device;

enabling the recipient component to authenticate the system event message by determining that the hash, included in the system event message, corresponds to the hash generated using the provided hashing parameters and the prior system event message; and performing at least one action in response to data contained in the authenticated system event message, the at least one action including at least one of determining information associated with the system event, performing a remedial action, logging the data, or forwarding the data to a target recipient.

6. The computer-implemented method of claim 5, wherein the source component is a Basic Input Output System (BIOS) on the computing device.

7. The computer-implemented method of claim 6, further comprising:

causing the provided hashing parameters to be stored before the operating system is executing on the computing device.

8. The computer-implemented method of claim 5, wherein the operating system, when executing on the computing device, provides a separate entity, associated with the operating system, with bare metal access to the computing device.

9. The computer-implemented method of claim 5, wherein the system event message is a system event log (SEL) message relating to a hardware error or a software error on the computing device.

10. The computer-implemented method of claim 5, wherein the hash value is generated using a SHA-256, SHA-512, or HMAC hashing algorithm.

11. The computer-implemented method of claim 5, wherein the recipient component is a baseboard management controller (BMC) on the computing device.

12. The computer-implemented method of claim 5, wherein the event message is sent using an SMBus System Interface (SSIF).

13. A non-transitory computer-readable storage medium including instructions that, when executed by the processor, cause the processor to:

detect, on a computing device, a system event;

generate, by a source component on the computing device, a system event message corresponding to the system event;

cause a hash to be included in the generated system event message, the hash generated using provided hashing parameters and a prior system event message, the provided hashing parameters for the hash value being stored in unmapped memory at boot time and inaccessible to an operating system (OS) executing on the computing device;

send the system event message, including the hash, over a specified communication channel to a recipient component on the computing device;

enable the recipient component to authenticate the system event message by determining that the hash, included in the system event message, corresponds to the hash generated using the provided hashing parameters and the prior system event message; and perform at least one action in response to data contained in the authenticated system event message, the at least one action including at least one of determining information associated with the system event, performing a remedial action, logging the data, or forwarding the data to a target recipient.

14. The non-transitory computer-readable storage medium of claim 13, wherein the source is a Basic Input Output System (BIOS) on the computing device, and wherein the instructions when executed further cause the system to:

cause the provided hashing parameters to be stored to BIOS memory before the operating system is executing on the processor.

15. The non-transitory computer-readable storage medium of claim 13, wherein the operating system, when executing on the processor, provides a separate entity, associated with the operating system, with bare metal access to the system.

16. The non-transitory computer-readable storage medium of claim 13, wherein the hash value is generated using a SHA-256, SHA-512, or HMAC hashing algorithm.

17. The non-transitory computer-readable storage medium of claim 13, wherein the recipient is a baseboard management controller (BMC) on the computing device, and wherein the event message is sent using an SMBus System Interface (SSIF).

* * * * *